Nov. 3, 1959 R. A. BERGSTEN 2,910,888
VEHICLE FOOTREST PEDAL ATTACHMENT
Filed Dec. 17, 1957
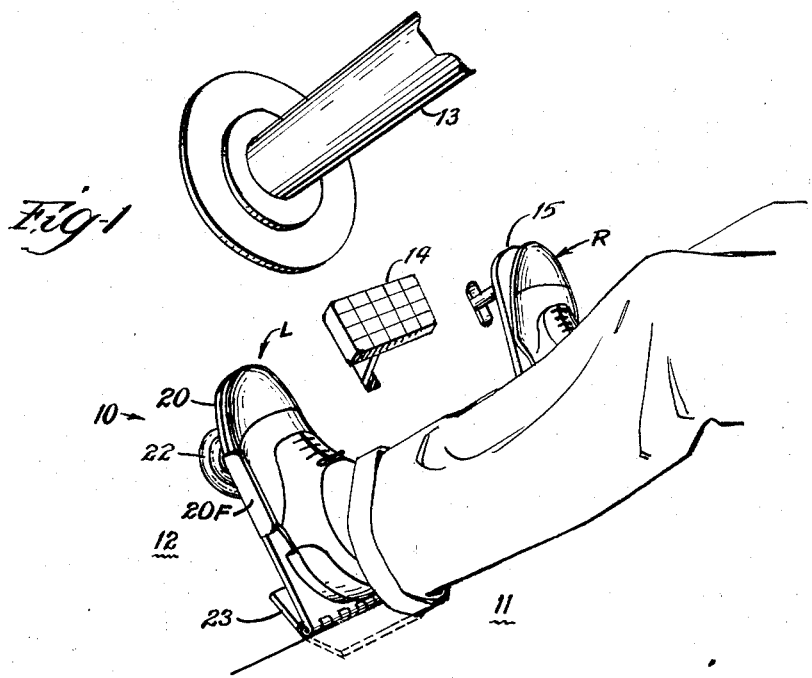
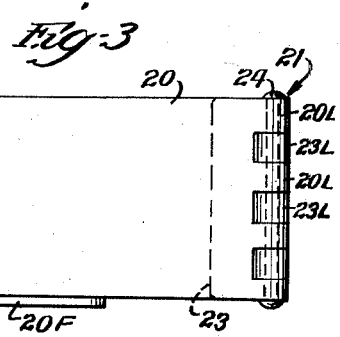
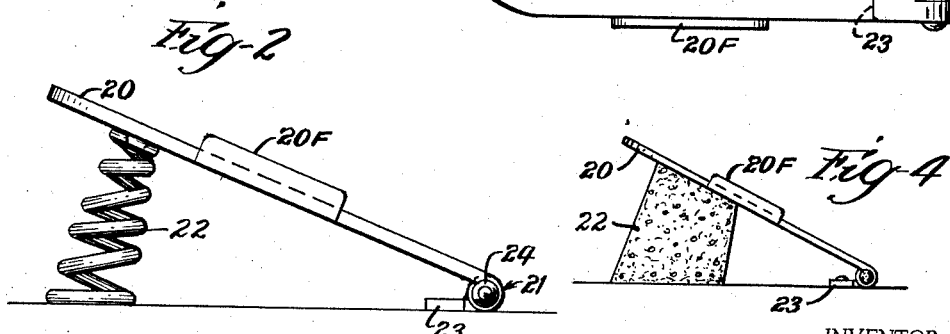
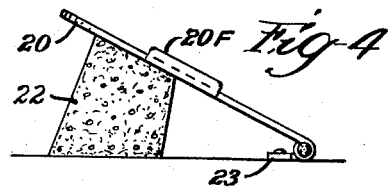
INVENTOR.
Ralph A. Bergsten
BY
Mann, Brown & McWilliams
Attys.

United States Patent Office 2,910,888
Patented Nov. 3, 1959

2,910,888

VEHICLE FOOTREST PEDAL ATTACHMENT

Ralph A. Bergsten, Barrington, Ill.

Application December 17, 1957, Serial No. 703,448

6 Claims. (Cl. 74—564)

Great attention is being given in the automobile industry to driver comfort and to the elimination of driver fatigue, and various studies of accident statistics indicate that driver fatigue, in particular, is one of the significant causative factors of our high national rate of automobile accidents. There is, in fact, a marked trend towards improving the driver's seating conditions, caused probably by the unusually severe fatigue conditions associated with monotonous modern super highway driving on which drivers select and maintain a fixed speed for many hundreds of miles.

The seating arrangements for the drivers of present-day automobiles require that the driver assume a somewhat distorted position, since the right foot must rest upon and have its positional relationship determined by the location and disposition of the accelerator pedal, whereas the left foot can only rest upon the floorboard, in which case it necessarily assumes a somewhat different positional relationship. Experience has shown that this diverse positioning of the driver's feet leads to driver fatigue, presumably because the driver's hips are caused to assume a somewhat distorted and less comfortable position. These difficulties with present-day seating arrangements for automobiles can be particularly severe in the instance of drivers having physical impairments such as sacroiliac troubles.

The principal object of the present invention is to minimize driver fatigue by providing a more comfortable driving position, and towards this end a vehicle footrest in the form of a pedal attachment is provided for the driver's left foot.

As a further object the footrest is arranged to simulate, with respect to the driver's left foot, the positional relation and action of the accelerator pedal with respect to the driver's right foot.

Other objects and advantages will become apparent during the course of the following description.

In the accompanying drawings forming a part of this specification and in which like numerals are employed to designate like parts throughout the same:

Fig. 1 is a fragmentary perspective view of a typical vehicle floorboard arrangement at the driver's position, showing the left footrest of the invention in use;

Fig. 2 is a side-elevational view of one constructional embodiment;

Fig. 3 is a plan view of the footrest of Fig. 2; and

Fig. 4 is a side-elevational view of another constructional embodiment of the footrest of the invention.

For purposes of disclosure, the left footrest of the invention is shown in the form of a pedal attachment 10 for a motor vehicle that includes a floorboard having the familiar horizontal portion 11 and a toe board portion 12 obliquely inclined upwardly and forwardly with respect to the horizontal portion. To better indicate the positional arrangement of the footrest 10, the familiar steering column 13 and brake pedal 14 are shown, as well as the usual accelerator pedal 15, which is arranged for actuation by the driver's right foot R.

As is conventional, the accelerator pedal 15 is pivotally supported for depressible swinging movement towards the toe board portion 12, and the purpose of the invention is to provide a footrest 10 arranged to present to the driver's left foot L the same positional relationship and action as is presented to the driver's right foot by the accelerator pedal 15. Thus the driver, when riding in a vehicle embodying the present invention, is aided in maintaining a uniform position for both legs such as will hold the driver's hips in an even relation and provide a more comfortable driving position to thereby minimize strain and fatigue on the driver.

According to the invention, in instances where the accelerator pedal is "toed out," the left footrest is preferably "toed out" at the same relative angle and is located at the same relative height from the floorboard in relation to the driver's left foot as is the accelerator pedal in relation to the driver's right foot.

As a further feature the left footrest includes facilities for resiliently resisting depressible swinging movement thereof towards the toe board 12, and such facilities preferably simulate the resistance to depressible swinging movement presented by the accelerator pedal so that the reactions against both feet may be maintained substantially equal. Thus, as the vertical angle of the right foot changes when actuating the accelerator, the vertical angle of the left foot can change correspondingly and both feet will be in the same corresponding positions and will be subjected to corresponding reactions.

In the illustrated arrangement the footrest of the invention includes a left foot pedal 20 generally corresponding with respect to the left foot to the relationship of the accelerator pedal 15 with respect to the right foot, a hinge 21 for anchoring the heel end of the pedal 20 for swinging movement towards and away from the toe board, and a helical coil spring 22 engageable with the foot pedal and the floorboard to yieldably resist depressible swinging movement of the pedal and to bias the pedal to its neutral upwardly inclined position, in which it is shown in Fig. 2. Preferably the spring 22 is adjacent the extreme toe end of the foot pedal 20.

The illustrated arrangement is useful as an attachment to existing vehicles and, for such purpose, may include a mounting pad in the form of a plate 23 which, as indicated in full lines in Fig. 1, may be secured along the toe board in any suitable manner or, as indicated in dotted lines, may fold forward for securement to the horizontal floorboard. Screw-thread fasteners, rivets, or nut-and-bolt assemblies are preferred for this purpose.

The hinge 21 is shown in the form of the familiar double-leaf construction wherein alternate leaves 20L and 23L are carried by the pedal 20 and mounting pad 23, respectively, and connected for free-swinging movement by a common hinge pin 24. The helical coil spring 22 is shown in the form of a conical helix, which form is easily adapted to simulate the resistance-to-movement characteristic of the accelerator pedal. The upper end of the spring 22 is anchored to the underneath side of pedal 20, such, for example, as by spot-welding the top coil thereof to the plate 20, while the bottom coil may float freely and react against the floorboard to yieldably maintain the foot pedal in its normal upwardly inclined position.

The desired resilient resistance to movement may be provided for the pedal 20 by a suitably designed, straight helix-type coil spring or, as shown in Fig. 4, may be embodied as a block 25 having the form of a truncated wedge. This block is preferably of sponge rubber, though other suitable rubber-like materials are contemplated.

It is recognized that the disclosed spring arrangements do not accommodate flooring of the left foot pedal, and this is preferred inasmuch as it tends to discourage driving at maximum speeds for extended periods of time. If desired, however, the spring arrangements could be suitably countersunk to provide full closing movement between the pedal 20 and the toe board. As an additional feature, the invention contemplates that in newer car constructions the light-deflection button may be mounted on the toe board, preferably centrally of the bottom coil spring 22, for actuation by the footrest pedal 20.

Experience has shown that ample mounting room exists for locating the left footrest in proper position in existing cars, and the light-deflection buttons at the far left side of vehicle floorboards are still readily accessible. In this connection, however, it is preferred to provide an upstanding, vertical flange 20F medially along the left edge of the left foot pedal 20 to act as a positioning stop for engaging the left side of the driver's left shoe sole to assist in maintaining the left shoe on the footrest without conscious effort by the driver. Such a flange prevents accidental movement of the left foot such as might result in actuating light-deflection buttons while aiding the attainment of a relaxed, comfortable position for the left foot. The flange is short enough to permit ready removal of the foot for actuating any floor buttons at the left side of the car.

The footrest of the invention is not to be confused with left-foot extensions of the accelerator pedal. The present footrest operates completely independently of the accelerator pedal and of any other devices in the car and offers no safety hazards.

While the invention has been described in connection with a pedal attachment for application to existing vehicles, it will be apparent that the disclosed construction may readily be embodied in original equipment; or, as will become apparent to those skilled in this art, the mounting details may be varied considerably, particularly in the case of original equipment; for example, the footrest may be mounted in substantially the same manner as the accelerator pedal. One such illustrative example includes a pedal having a rod passing through the floorboard to engage a spring disposed therebeneath. The spring could be arranged either to resist compression as in the disclosed embodiments or to resist tension.

It should be understood that the description of the preferred form of the invention is for the purpose of complying with Section 112, Title 35, of the U.S. Code and that the claims should be construed as broadly as prior art will permit.

I claim:

1. In a motor vehicle having a floorboard including a generally horizontal portion and a toe board portion obliquely inclined upwardly and forwardly with respect to the horizontal portion and having the usual brake pedal with a right foot accelerator pedal located to the right thereof and pivotally supported for depressible swinging movement towards said toe board portion, the combination therewith of a left foot rest in the form of a pedal attachment located to the left of said brake pedal, said footrest comprising a left foot pedal, mounting means pivotally connecting said left foot pedal to said floorboard for depressible swinging movement thereof towards said toe board portion completely independent of said accelerator pedal, said left foot pedal being located in a position substantially duplicating with respect to a driver's left foot the location and movement of the accelerator pedal with respect to the driver's right foot, and yieldable means acting directly on said left foot pedal to resist depressible swinging movement of said left foot pedal towards said toe board portion.

2. The combination as set forth in claim 1 wherein said yieldable means has a characteristic yielding resistance to depressible swinging movement of said left foot pedal towards said toe board portion corresponding to the inherent yielding resistance presented to depressible swinging movement of the accelerator pedal towards said toe board portion.

3. The combination as set forth in claim 1 wherein said resilient means is in the form of a helical coil spring disposed between and having its opposite ends reacting between said toe board portion and said left foot pedal.

4. The combination as set forth in claim 1 wherein said resilient means is in the form of a block of rubber-like material having the shape of a truncated wedge and is disposed between and reacts between said toe board portion and said left foot pedal.

5. The combination as set forth in claim 1 wherein an upstanding vertical flange is provided on said left foot pedal adjacent the left edge thereof.

6. The combination as set forth in claim 1 wherein said mounting means includes a rigid attachment plate for fixed connection with said floorboard, a hinge interconnecting adjacent ends of said attachment plate and said left foot pedal for free-swinging relative opening and closing movement, and wherein said yieldable means comprises a compressible spring disposed underneath said left foot pedal and reacting between the forward portion of said left foot pedal and said floorboard to yieldably maintain said left foot pedal in upwardly inclined normal position.

References Cited in the file of this patent

UNITED STATES PATENTS

| | | |
|---|---|---|
| 850,507 | Waldon | Apr. 16, 1907 |
| 984,571 | La Croix | Feb. 21, 1911 |
| 1,480,421 | Smith | Jan. 8, 1924 |
| 1,508,289 | Oliver | Sept. 9, 1924 |
| 1,525,864 | Hueseman | Feb. 10, 1925 |
| 1,614,638 | Wriston | Jan. 18, 1927 |
| 1,626,722 | Cole | May 3, 1927 |
| 1,826,968 | Townsend et al. | Oct. 13, 1931 |
| 2,167,959 | Pomernacki | Aug. 1, 1939 |
| 2,252,013 | Leupold | Aug. 12, 1941 |
| 2,507,807 | Newbern | May 16, 1950 |
| 2,836,990 | De Heer | Jan. 3, 1958 |